United States Patent [19]

Abernethy

[11] 4,043,369

[45] Aug. 23, 1977

[54] EDGE DEFORMABLE LOCK NUT

[76] Inventor: Robert R. Abernethy, 7295 Walton Road, Walton Hills, Ohio 44116

[21] Appl. No.: 665,918

[22] Filed: Mar. 11, 1976

[51] Int. Cl.$^2$ .................... F16B 39/12; F16B 29/28
[52] U.S. Cl. ............................. 151/21 C; 10/86 A
[58] Field of Search .................. 151/21 R, 21 C, 37; 85/1 C, 61, 62; 10/86 R, 86 A, 86 CL

[56] References Cited

U.S. PATENT DOCUMENTS

| 181,716 | 8/1876 | Pickles | 151/21 C |
|---|---|---|---|
| 845,250 | 2/1907 | Newman | 151/15 |
| 1,064,699 | 6/1913 | Berns | 151/37 |
| 1,409,934 | 3/1922 | Dunham | 151/21 C |
| 1,767,653 | 6/1930 | Davis | 85/1 C |
| 2,215,930 | 9/1940 | Mahla | 85/46 |
| 2,399,107 | 4/1946 | Eckenbeck et al. | 151/21 R |
| 3,177,914 | 4/1965 | MacLean et al. | 151/21 C |
| 3,823,526 | 7/1974 | Rose | 151/37 X |
| 3,854,372 | 12/1974 | Gutshall | 85/62 X |
| 3,865,007 | 2/1975 | Stanback | 85/61 |

FOREIGN PATENT DOCUMENTS

| 685,357 | 3/1930 | France | 151/21 C |
|---|---|---|---|
| 270,357 | 5/1927 | United Kingdom | 151/21 C |
| 760,297 | 10/1956 | United Kingdom | 151/21 C |

Primary Examiner—Roy D. Frazier
Assistant Examiner—Thomas J. Holko
Attorney, Agent, or Firm—Donnelly, Maky, Renner & Otto

[57] ABSTRACT

A lock nut, which is relatively free running as it is screwed onto a male threaded member, provides a two-way locking action as it is tightened to abutment with a confronting load bearing surface, with the result that a breakaway torque that is a high percentage of the applied locking torque must be applied to loosen the lock nut. One or both ends of the lock nut have an annular dish shape commencing at the relatively high corners at the juncture of adjacent pairs of wrenching side faces and recessing into the body toward the threaded bore therethrough. The corner high points are thus relatively thinned for biting and spreading into the confronting surface to provide one locking function, and the corner high points also act as fulcrum points to obtain early torque transfer from the outer edges to the body of the lock nut over a large number of threads for controlled bending of the body to bear radially into locking engagement against the male threaded member.

9 Claims, 8 Drawing Figures

EDGE DEFORMABLE LOCK NUT

BACKGROUND OF THE INVENTION

The present invention is directed to a lock nut and, more particularly, to a lock nut that is substantially free running when screwed onto a male threaded member and has a breakaway torque which is a relatively high percentage of the applied locking torque. The lock nut of the present invention provides a two-way locking action by biting and spreading into a confronting surface and by deforming in response to reaction force applied first at the thinned corners and later at the edge perimeter of the bearing end face to bear radially against the male threaded member locking thereto.

A primary design consideration for most if not all lock nuts is to make certain that the lock nut resists loosening until a suitable breakaway torque is applied. There are of course many different known types of lock nuts. One known type of lock is a spring nut formed of a relatively thin stamping usually with only one and a fraction thread, which has the disadvantage of a very low locking torque and a correspondingly small breakaway torque. Also, in U.S. Pat. No. 1,734,445 there is disclosed a related prior art lock nut which has radial saw cuts across each pair of wrenching side faces defining plural sector-like portions or castellations, and at the opposite or bearing end face of the lock nut directed toward a confronting surface against which the lock nut is to be tightened, the lock nut has a dished portion to define a continuous circular fulcrum. As the lock nut is tightened on a bolt to engagement with a confronting surface, the reaction force applied by the latter to the circular fulcrum causes the castellations to bear radially inward tightly gripping the shank of the bolt to lock thereto.

Another spring-type lock nut is shown in U.S. Pat. No. 2,016,610 and has an arch-like profile so that upon tightening the lock nut on a bolt to engagement with a confronting surface, the reaction force from the latter creates a spring pressure in the opposed ends of the arch deforming the lock nut which pinches the bolt to lock thereto. U.S. Pat. Nos. 2,495,409 and 2,546,332 show still other lock nuts which have a continuous annular groove in the side faces thereof concentric about the bore so that upon tightening the lock nuts on a bolt against a confronting surface the groove facilitates deforming of part of the lock nut body so that the female threads in the bore distort and frictionally lock to the male threads on the bolt.

SUMMARY OF THE INVENTION

The lock nut of the present invention normally provides a two-way locking operation when tightened on a male threaded member to secure abutment with a relatively fixedly located confronting surface of a workpiece, a washer, or the like. The lock nut has a plurality of side faces or flats about its edge perimeter for wrenching, i.e. for applying tightening or breakaway torque to the lock nut by a wrench, and adjacent pairs of such side faces join at respective corners so as to define a generally polygonal shape perimeter about at least one end face of the lock nut body. That end face is intended to bear against a confronting surface when the lock nut is tightened on a bolt, thus being referred to below as a bearing end face, and it has a generally annular dished portion commencing at the mentioned corners as relatively high points on the dished concavity and recessing into the body in a radial direction toward a central bore through the body. The corners are, therefore, relatively thinned to decrease friction and enhance spreading of the corners into locking engagement with the confronting surface as the nut is tightened, thus providing a first locking function, and those corner high points also serve as first fulcrum points to which reaction forces from the confronting surface is uniformly applied to deform the body so as bear radially tightly against the male threaded member locking onto the same and providing the second locking function. The initial corner contact and then the peripheral edge contact at the extremities of the annular dish effect a strong, fast locking response.

The lock nut may be non-reversible, i.e. dished at one end face and flat on the other, or it may be reversible, i.e. dished at both end faces. Moreover, the height of the lock nut above the confronting surface provides a visual indication of the relative locking torque applied thereto and the breakaway torque required to loosen the nut from its locked condition. Additionally, the lock nut may include serrations in the outer perimeter of the dished portion for further locking interference with the confronting surface. Also, a thinned mid-section may be provided in the side faces circumscribing the bore to facilitate deformation of the lock nut body and/or to control the application of radial bearing forces against the male threaded member. The lock nut may be somewhat self-limiting by forming the same of a material that so deforms upon over-tightening to reduce the efficiently available wrenching surfaces and/or by providing an annular flat land at the inner circumference of the dished portion to limit spreading and penetration of the thinned corners and peripheral edge onto and into the confronting surface.

With the foregoing in mind, it is a primary object of this invention to provide a lock nut that has a breakaway torque which is a relatively high percentage of the applied tightening or locking torque, and, moreover, to provide such a lock nut that is relatively free running during tightening at least until locking response is commenced.

Another object is to maximize force transmission and coupling between the lock nut and a male threaded member and between the lock nut and a confronting load bearing surface.

An additional object is to obtain a multiple-way locking of a lock nut device or the like on a threaded member and in engagement with a confronting load bearing surface, and to obtain a relatively rapid locking response upon tightening the lock nut against such a confronting surface.

A further object is to effect both biting and deforming actions to secure a lock nut on a threaded member and in engagement with a confronting load bearing surface.

Still another object is to facilitate resiliently deforming a lock nut.

An additional object is to provide a visual indication of relative locking torque on a lock nut secured to a threaded member in engagement with a confronting load bearing surface.

Still a further object is to limit the locking torque on a lock nut secured to a threaded member in engagement with a confronting load bearing surface.

Yet another object is to provide improved holding power or locking force for a jam nut arrangement.

These and other objects and advantages of the present invention will become more apparent as the following description proceeds.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

DESCRIPTION OF THE PREFERRED EMBODIMENTS

Figure 1:
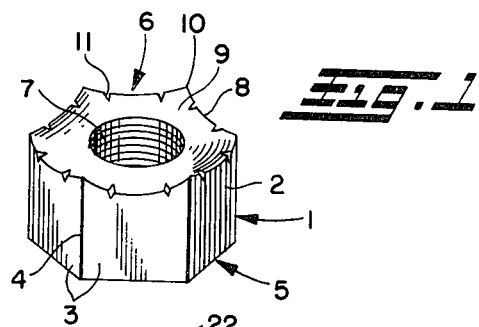
FIG. 1 is an isometric view of a non-reversible lock nut having one dished end face and one non-dished end face in accordance with this invention.

The invention will now be described with reference specifically to the drawing, wherein like reference numerals designate like parts in the several figures and wherein letter suffixes are employed to designate similar, but modified parts identified in preceding figures by the same reference numeral. Initially referring to FIG. 1, a lock nut in accordance with the invention is generally designated at 1. The body 2 of the lock nut 1 is preferably formed of metal but in some applications may be made of plastic, and includes any desired number of side faces 3 with adjacent pairs thereof meeting at respective corners 4 to facilitate wrenching, i.e. application of torque to the lock nut by a conventional wrench, pliers, socket wrench, or other similar tool.

The lock nut 1 also has two opposite end faces 5, 6. If the lock nut is to be non-reversible, one of the end faces 5 may be flat or otherwise formed without regard to effecting a locking function with respect to a confronting surface. The other end 6 has a generally dish shape to be described in greater detail hereafter and hereafter referred to as a bearing end face in that part or all of it is intended to bear against a confronting surface. The confronting surface, then, bears the load force imposed by the lock nut as it is tightened on a male threaded member, such as a threaded stud or the like, located in and preferably passing through the female threaded bore 7 of the lock nut 1, and applies a reaction force to the lock nut normally deforming the same.

The bearing end face 6 is concavely dished commencing at the edge perimeter 8 thereof as relatively high points on the dished portion 9 and recessing into the body in a direction radially toward the bore 7. Thus, the dished portion 9 may be considered to be of a generally annular shape, albeit the outer circumference thereof will be somewhat flattened, squared or the like, as it takes on the configuration defined by the perimeter 8. Since the corners 4 are radially most remote from the bore 7, the highest or most protruding points 10 on the dished bearing end face 6 will be at the respective corners, and preferably the corner points 10 will be relatively thinned to bite and spread into and onto the material of a confronting surface as the lock nut 1 is tightened.

The material of which the lock nut 1 is comprised is preferably a relatively soft metal to facilitate locking deformation in a manner to be described in more detail below. The dished portion is desirably formed by a cold heading process or the like during which the corner points 10 will be sharply defined, and the formed lock nut is then desirably surface hardened by a heat treating procedure so that while the core of the body 2 will remain relatively malleable or soft, the exterior surfaces thereof will be relatively hard to bite and spread into and onto the material of the confronting load bearing surface, to permit wrenching without failure, etc. Moreover, serrations 11 may be provided in the peripheral edge perimeter of the lock nut 1 for further resistance to unlocking of the lock nut after it has been tightened to locked condition against a confronting load bearing surface.

Figure 2:
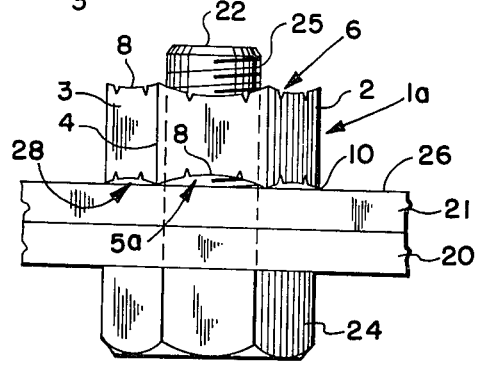
FIG. 2 is an elevation view of a reversible lock nut, having two dished end faces, in accordance with this invention, shown positioned on a threaded stud in initial abutment with a confronting surface ready to commence a locking response upon further tightening.
Figure 3:
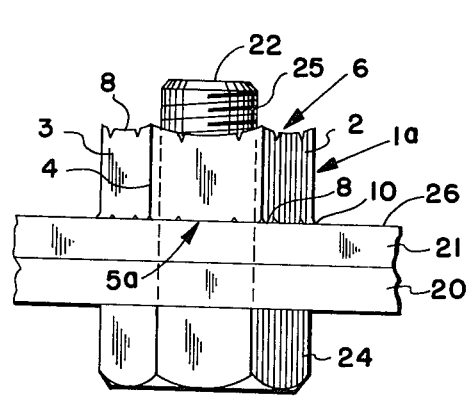
FIG. 3 is an elevation view similar to FIG. 2, wherein the lock nut has been tightened to locking condition.
Figure 4:
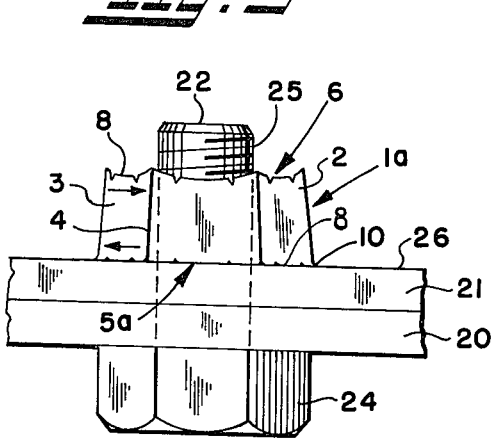
FIG. 4 is an elevation view similar to FIGS. 2 and 3, wherein the lock nut has been over-tightened.

Turning to FIGS. 2, 3 and 4, the operation of the lock nut of the present invention will now be described with reference to a reversible lock nut 1a, which is substantially identical to the lock nut 1 described above with reference to FIG. 1 except that both end faces 5a and 6 are dished in the above described manner. In FIGS. 2, 3 and 4 two normally separable pieces 20, 21 are to be tightly secured in abutting relation by a male threaded bolt member 22 cooperating with the lock nut 1a, whereby the two pieces are clamped between the bolt head 24 and lock nut. Part of the bolt stud portion 25, which passes through aligned openings in the two pieces 20, 21, extends beyond the surface 26 of the piece 21 for engagement by the lock nut 1a whereby tightening of the lock nut on the bolt stud portion 25 causes the corner points 10 on the lock nut to effect their locking function against the confronting surface 26.

Initially, the lock nut 1a may be relatively freely screwed onto the bolt stud portion 25 until the corner points 10 touch the confronting load bearing surface 26. Thereafter, the application of additional tightening or locking torque to the lock nut 1a will normally cause the corner points 10 to spread onto the confronting surface 26 of the piece 21. At the same time, the confronting surface 26 will apply a reaction force to each of the fulcrums defined by the corner points 10 promptly to initiate a locking response by deformation of the body of the lock nut 1a so that the material of the body 2, especially that material proximately surrounding the bore 7, will yieldably deform more and more strongly radially against the bolt stud portion 25. Since the corner points 10 are evenly distributed about the perimeter of the bearing end face 6, the force deforming the lock nut and the bearing force of the latter against the stud portion 25 will be substantially uniformly distributed in the lock nut and about the circumference of the stud portion. The location of the distorting fulcrums, i.e. the corner points 10 at extremities relative to the body 2 and the bore 7, extends the active lever arm on which the reaction force works to distort the body 2, thus effecting a fast locking response, a balanced torque transfer over a relatively large number of threads, etc.

Until the relatively thinned corner points 10 of the lock nut 1a begin spreading, the perimeter 8 of the lock nut has a somewhat scalloped appearance, as is indicated at 28 in FIG. 2. However, as the lock nut is further tightened, the corner points 10 preferably begin to spread and embed in the confronting surface 26, and the reaction force applied by the confronting surface to the fulcrum corner points will cause initial deformation of the body 2 causing it to bear radially against the stud portion 25 locking thereto. As the lock nut is still further tightened, a greater portion of the perimeter 8 thereof will serve as the deforming fulcrum to effect even more secure locking onto the stud portion. During tightening of the lock nut 1a, the height of the end face 5a above the plane of the surface 26 may be used as a visual gauge of the relative locking torque applied to the lock nut by a wrench or the like, not shown.

Preferably, when the lock nut has been fully tightened to locking condition, as illustrated in FIG. 3, the profile of the perimeter 8 about the bearing end face 5a will be substantially linear, and the body 2 will be somewhat deformed to bear relatively strongly against the stud portion 25 also locking thereto as previously described. Providing dished bearing end faces at both ends 5a, 6 of the lock nut has the advantage that either end may be used to establish the desired locking engagement with a confronting surface, rather than just the one end 6 of the FIG. 1 lock nut embodiment. Also, the other dished bearing end face not contacting the confronting surface provides a thinned body at that portion reducing somewhat the amount of reaction force required to effect a strong bearing force against the stud portion 25 at that point.

If the lock nut 1a is over-tightened beyond the desired locking torque, the reaction force exerted by the confronting load bearing surface 26 against a then generally flattened perimeter 8 effective as the deforming fulcrum will cause further deformation of the lock nut body in the direction of the arrows as illustrated in FIG. 4. Such further deformation will diminish the available wrenching surfaces of the side faces 3, and therefore, an open end wrench, for example, placed over diametrically opposite side faces 3 will tend to slide off the lock nut to preclude further over-tightening.

In tests, one such lock nut was relatively freely screwed onto a male threaded member and tightened to engagement with a confronting surface by a torque of thirty foot pounds. Thereafter, to loosen the lock nut from its locked condition for removal of the lock nut required an initial breakaway torque of twenty-two foot pounds. In a second similar test of the same lock nut, which was again relatively free running as it was turned up to engagement with the confronting surface, a locking torque of forty foot pounds was applied to lock the nut and then a breakaway torque of thirty foot pounds was required to loosen the nut.

Figure 5:
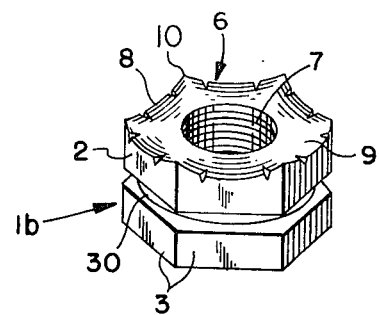
FIG. 5 is an isometric view of a modified lock nut having a thinned mid-portion.

A further modified lock nut is generally indicated at 1b in FIG. 5, which is similar to the lock nut 1 previously described, except that a groove 30 is formed in the side faces 3 circumferentially about the lock nut 1b. The cross-section of the groove 30 preferably is relatively smoothed or curved to avoid sharp transitional areas where excessive stress concentrations might occur and possibly damage the lock nut as it is deformed by tightening to engagement with a confronting load bearing surface. The thinned mid-section of the body 2 thus obtained by the groove 30 both facilitates deformation of the body 2 to bear against a stud located therein, for example, in the manner described above with reference to FIGS. 2, 3 and 4, and helps distribute those radial bearing forces more evenly along the length of the bore 7.

Figure 6:
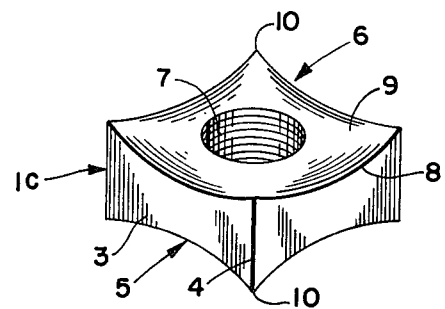
FIG. 6 is an isometric view of another form of lock nut in accordance with this invention.

Turning now to FIG. 6, a further modified lock nut 1c is shown which is similar in all respects to the lock nut 1a with the exception of the rectangular profile thereof. Thus, the lock nut 1c has side edges 3, corners 4, end faces 5, 6 at least one of which is dished, as at 9, a female threaded bore 7, and so on. Operation of the lock nut 1c is identical to the operation described above with reference to the lock nut 1a illustrated in FIGS. 2, 3 and 4.

Figure 7:
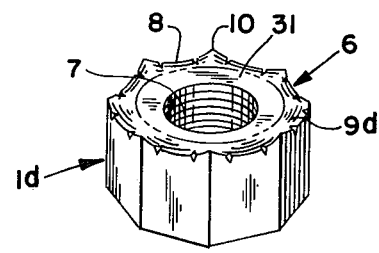
FIG. 7 is an isometric view of a further modified lock nut in accordance with this invention, including a penetration limiting land in the dished end face.

In FIG. 7 still another modified lock nut 1d is illustrated, which is similar to the lock nuts previously described, except that in the bearing end face 6 the dished portion 9d does not extend fully to the bore 7, but rather terminates intermediate the inner and outer peripheries of the bearing end face in a flat annular land area 31. Generally, the lock nut 1d of FIG. 7 operates in the same manner as the lock nut 1a described above with reference to FIGS. 2, 3 and 4, whereby the thinned high corner points 10 first engage a confronting bearing surface as the lock nut is tightened and then spread causing the body 2 of the lock nut to deform and bear against the stud in the bore 7. However, the land 31 will determine the maximum spreading and penetration of the corner points 10 and the parts of the perimeter 8 proximate the same onto and into the confronting surface in order to limit the maximum locking torque, and thus, the breakaway torque, and to avoid too deep penetration into the confronting load bearing surface. Also, such land 31 will limit the amount of bending deformation of the lock nut into tight frictional engagement with the bolt stud portion 25 as previously described. In normal use, it is preferred to limit the amount of torque applied to the lock nut so that the lock nut material is not stressed beyond its modulus of elasticity. Controlled torquing results in a general evenness of the tightening area and allows the lock nut to be released and reused as desired with little or no adverse effect on its operation.

Figure 8:
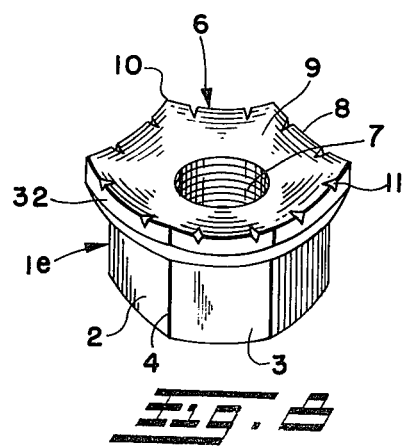
FIG. 8 is an isometric view of still another modified lock nut in accordance with this invention, having an enlarged dish shape flange at one end defining an enlarged dished end face.

The lock nut 1e shown in FIG. 8 is also quite similar in both configuration and operation to the lock nuts 1 and 1a previously described. However, the lock nut 1e has an enlarged flange 32 adjacent one end, which is dish shape at the bearing end face 9 to increase the surface area of the bearing end face subject to spreading or flexing and further extend the active lever arm for the corner high points 10 on which the reaction force works to distort the body 2.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

The embodiments of the invention in which an exclusive property or privilege is claimed are defined as follows:

1. A lock nut positionable on a male threaded member, comprising a body made of metal having a relatively soft interior core and a relatively hard exterior, threaded bore means through said body for securing said lock nut to a male threaded member, said body having a plurality of side faces and opposite end faces, adjacent pairs of said side faces joining at respective corners and defining a generally polygonal shape perimeter for at least one of said end faces of said body, said one end face of said body having a generally annular dished portion commencing at said corners as relatively high points and recessing into said body toward said bore means, said corner high points being relatively hard and thinned for biting and spreading into a confronting surface as said lock nut is tightened on such male threaded member and providing first fulcrum points at which force is applied by such confronting surface to yieldably deform said relatively soft interior core of said body to lock said nut substantially uniformly onto such member.

2. A lock nut as set forth in claim 1, wherein said side faces provide surfaces for wrenching, and said body is made of metal that deforms sufficiently causing said body to take on a tapered profile to reduce the effective wrenching surfaces provided by said side faces upon overtightening of said lock nut on a male threaded member into engagement with a confronting surface such that a wrenching tool will slip along the wrenching surfaces and preclude further tightening.

3. A lock nut as set forth in claim 1, further comprising a substantially smooth annular groove formed in said plurality of side faces circumferentially about said body.

4. A lock nut as set forth in claim 1, further comprising serrations in said perimeter of said at least one end face.

5. A lock nut as set forth in claim 1, wherein both said end faces of said body have a generally annular dished portion commencing at said corners as relatively high points and recessing into said body toward said bore means.

6. A lock nut as set forth in claim 1, wherein the other end face of said body is substantially flat.

7. A lock nut as set forth in claim 1, further comprising substantially flat land means in said one end face of said body centrally of said generally annular dished portion for limiting the penetration of said corners into a confronting surface and the amount of deformation of said body.

8. A lock nut as set forth in claim 7, wherein said land means comprises a generally annular ring centrally of said generally annular dished portion circumferentially about said bore means.

9. A lock nut as set forth in claim 1, wherein said body has an enlarged flange at said one end for increasing the surface area of said one end face and extending the active lever arm for said corner high points.

* * * * *